United States Patent       (10) Patent No.: US 12,505,606 B2
Fu et al.                  (45) Date of Patent:     Dec. 23, 2025

(54) GENERATION OF SUBSURFACE SCATTERING TEXTURE MAPS FOR 3D OBJECTS

(71) Applicants: SONY GROUP CORPORATION, Tokyo (JP); Sony Corporation of America, New York, NY (US)

(72) Inventors: Chen Fu, San Jose, CA (US); Mohammad Gharavi Alkhansari, San Jose, CA (US)

(73) Assignees: Sony Corporation of America, New York, NY (US); SONY GROUP CORPORATION, Tokyo (JP)

( * ) Notice: Subject to any disclaimer, the term of this patent is extended or adjusted under 35 U.S.C. 154(b) by 74 days.

(21) Appl. No.: 18/410,232

(22) Filed: Jan. 11, 2024

(65) Prior Publication Data

US 2025/0232514 A1   Jul. 17, 2025

(51) Int. Cl.
    *G06T 15/04*   (2011.01)
    *G06T 15/50*   (2011.01)
    *G06T 17/20*   (2006.01)

(52) U.S. Cl.
    CPC ............ *G06T 15/04* (2013.01); *G06T 15/506* (2013.01); *G06T 17/20* (2013.01)

(58) Field of Classification Search
    None
    See application file for complete search history.

(56) References Cited

U.S. PATENT DOCUMENTS

| 8,264,490 | B2 | 9/2012 | Debevec et al. |
| 9,401,043 | B2* | 7/2016 | Habel ................... G06T 15/506 |
| 11,216,646 | B1* | 1/2022 | Riviere ................ G06V 40/169 |
| 12,086,927 | B2* | 9/2024 | Urnau Gotardo ...... G06V 20/64 |
| 2005/0276441 | A1 | 12/2005 | Debevec |
| 2009/0226049 | A1 | 9/2009 | Debevec |
| 2011/0148864 | A1* | 6/2011 | Lee ........................ G06V 40/16 |
|  |  |  | 345/419 |
| 2012/0268571 | A1* | 10/2012 | Debevec ................. G06T 7/586 |
|  |  |  | 348/48 |

(Continued)

OTHER PUBLICATIONS

Donner, et al., "Light diffusion in multi-layered translucent materials", ACM Transactions on Graphics (ToG), 2005, 8 pages.

(Continued)

*Primary Examiner* — Nurun Flora
(74) *Attorney, Agent, or Firm* — CHIP LAW GROUP

(57) ABSTRACT

An electronic apparatus and method for generation of subsurface scattering texture maps for three-dimensional (3D) objects is provided. The electronic apparatus controls a set of light sources to generate a set of lighting patterns. The electronic apparatus controls a set of image capture devices to capture a set of images of an object that is illuminated by the generated set of lighting patterns. The electronic apparatus determines pixel-level offset information based on application of an image registration operation on the set of images. The electronic apparatus generates a set of corrected images based on the pixel-level offset information and the set of images. The electronic apparatus estimates subsurface scattering (SSS) parameters in a form of texture maps corresponding to a 3D mesh of the object. The estimation is performed based on a fitting of a scattering model on the set of corrected images.

20 Claims, 4 Drawing Sheets

(56) References Cited

U.S. PATENT DOCUMENTS

| | | | |
|---|---|---|---|
| 2016/0261850 A1* | 9/2016 | Debevec | G06V 40/16 |
| 2020/0020149 A1* | 1/2020 | Moltaji | G06T 11/001 |
| 2022/0072791 A1 | 3/2022 | Tastl et al. | |
| 2023/0124117 A1 | 4/2023 | Urnau Gotardo | |
| 2023/0196664 A1* | 6/2023 | Urnau Gotardo | H04N 13/243 |
| | | | 345/426 |

OTHER PUBLICATIONS

Ma, et al., "Rapid Acquisition of Specular and Diffuse Normal Maps from Polarized Spherical Gradient Illumination" Eurographics Symposium on Rendering, 2007 12 pages.

Jensen, et al., "A practical model for subsurface light transport", Proceedings of the 28th annual conference on Computer graphics and interactive techniques, 2001, 8 pages.

"NVIDIA Optical Flow SDK", URL: https://developer.nvidia.com/opticalflow-sdk.

Klehm Oliver et al: "Recent advances in facial appearance capture", XP071544917.

Velinov Zdravko et al: "Appearance capture and modeling of human teeth", XP058464807.

Zhu Yufeng, et al. "Estimating diffusion parameters from polarized spherical gradient illumination." ACM SIGGRAPH 2012 Talks. Jan. 1, 2012.

Abhijeet Ghosh; et al, "Practical Modeling and Acquisition of Layered Facial Reflectance", University of Southern California Institute for Creative Technologies, pp. 1-10.

* cited by examiner

GENERATION OF SUBSURFACE SCATTERING TEXTURE MAPS FOR 3D OBJECTS

CROSS-REFERENCE TO RELATED APPLICATIONS/INCORPORATION BY REFERENCE

None.

FIELD

Various embodiments of the disclosure relate to rendering of three-dimensional (3D) models of objects. More specifically, various embodiments of the disclosure relate to an electronic apparatus and a method for generation of subsurface scattering texture maps for 3D objects.

BACKGROUND

Advancements in the field of three-dimensional (3D) model rendering have introduced a wide array of texture maps, including but not limited to diffuse maps, specular maps, normal maps, and depth maps. These texture maps are applied to the surfaces of 3D models (or 3D meshes) of objects, serving multiple purposes. They can enhance photorealistic rendering and relighting of 3D models, allowing for the creation of intricate patterns and specific visual effects on these models. These patterns and visual effects can effectively convey specific details or surface reflectance characteristics associated with the objects represented in the 3D models. To generate these texture maps, a common approach involves capturing a series of images of the object from various angles using a set of cameras. These images are typically acquired while the object is illuminated by a set of light sources emitting distinct lighting patterns. This illumination process helps in determining the unique reflectance properties of the material comprising the object's surface, ultimately resulting in the creation of specialized texture maps from the collected image data. However, it's worth noting that certain properties of the object's surface can cause incident light to be absorbed into the surface, scattered at a subsurface level, and then reemerge from the surface. These particular surface characteristics may be not adequately captured in texture maps generated solely based on the object's surface reflectance properties.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for generation of subsurface scattering texture maps for 3-Dimensional (3D) objects, is provided substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
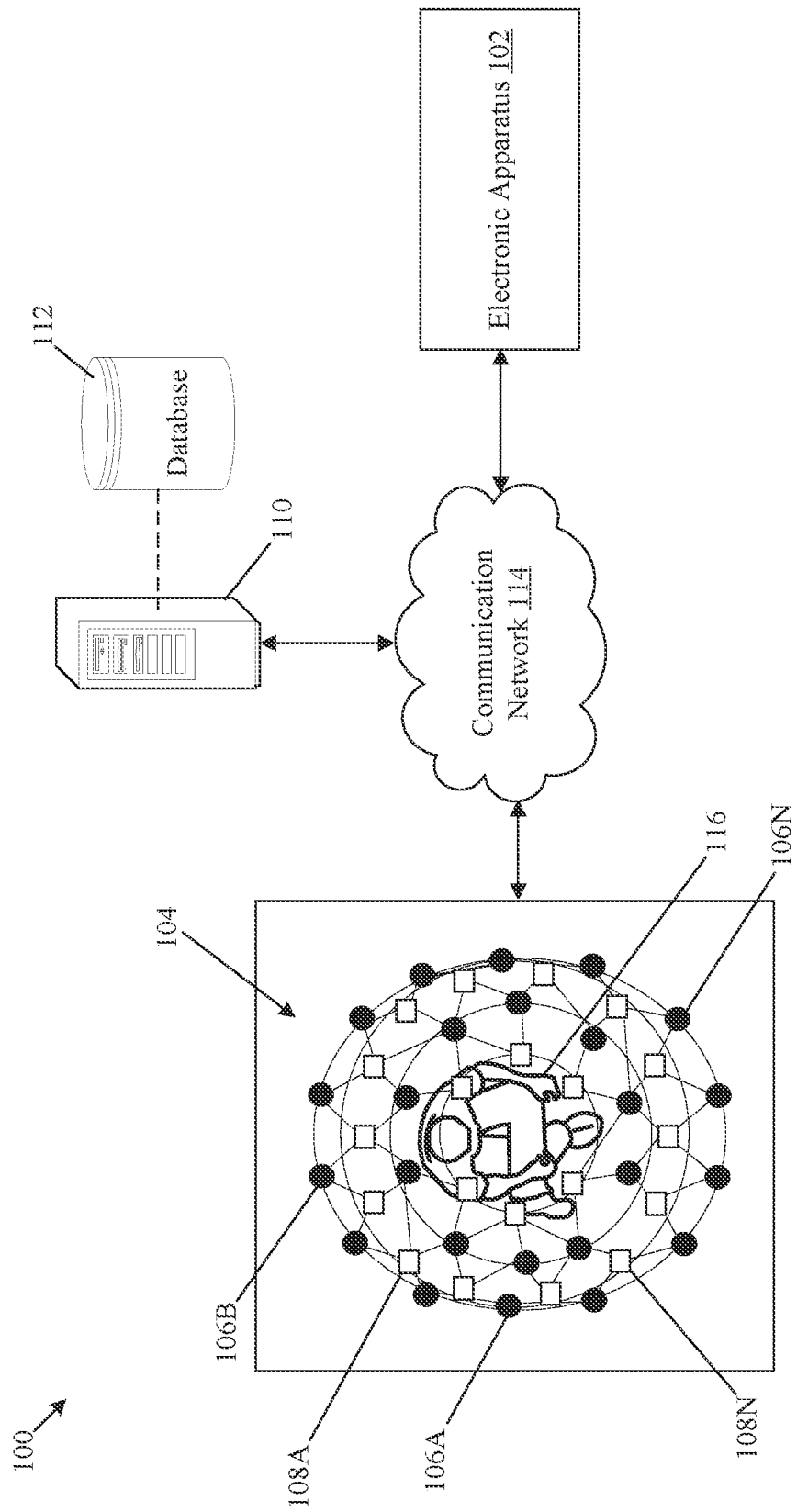
FIG. 1 is a diagram that illustrates an exemplary network environment for generation of subsurface scattering texture maps for 3D objects, in accordance with an embodiment of the disclosure.

The following described implementations may be found in a disclosed electronic apparatus and method for generation of subsurface scattering texture maps for 3-Dimensional (3D) objects. Exemplary aspects of the disclosure provide an electronic apparatus that may control a set of light sources to illuminate a 3D object and control a set of image capture devices to capture a set of images of the illuminated 3D object. The electronic apparatus may estimate subsurface scattering parameters of the 3D object and generate texture maps (such as a subsurface scattering color map and a subsurface scattering translucency map) indicative of the subsurface scattering parameters of the 3D object based on the set of images. Specifically, the electronic apparatus may control a set of light sources to generate a set of lighting patterns (for example, spherical gradient lighting patterns). The electronic apparatus may further control a set of image capture devices to capture a set of images of an object (for example, a human face) that may be illuminated by the generated set of lighting patterns. Once the set of images are captured, the electronic apparatus may determine pixel-level offset information. The determination of the pixel-level offset information may be based on application of an image registration operation on the set of images. Based on the pixel-level offset information and the set of images, the electronic apparatus may generate a set of corrected images. Finally, the electronic apparatus may estimate subsurface scattering parameters in a form of texture maps corresponding to a 3D mesh of the object. The estimation may be performed based on a fitting of a scattering model (for example, a multipole scattering model) on the set of corrected images.

Texture maps (such as albedo maps, normal maps, displacement maps, bump maps, height maps, and so on), for application on a 3D model of a 3D object (such as a human face), may be generated based on a set of images of the 3D object. The set of images may be captured based on an illumination of the 3D object by use of a set of lighting patterns emitted by a set of light sources. The texture maps may be indicative of specific properties of a material that may constitute the surface of the 3D object. For example, a normal map may be indicative of micro-geometry of the surface, a roughness map may be indicative of smoothness of the surface, a specular map may be indicative of reflective properties of the surface, and so on. Based on application of scanning techniques (such as photogrammetry) on the set of images, a 3D model of the 3D object may be generated. The texture maps may be applied on the surface of the 3D model of the 3D object for photorealistic rendering or relighting of the 3D model. However, surfaces of some 3D objects (such as human skin, leaf, or marble) may have certain properties that may cause light, incident on the surfaces, to be absorbed into the surface. The absorbed light may be scattered inside the surface. The scattering may lead to penetration of the absorbed light to a certain depth (inside the surface) before reemergence of the scattered light from the surface. It may be necessary to account for such properties for an accurate rendering of 3D models of such 3D objects using texture maps that may be indicative of such properties. The existing texture maps may be indicative of material properties restricted to the surface of the 3D objects.

In order to address aforementioned issues, the proposed electronic apparatus may be configured to estimate one or more sub-surface scattering (SSS) parameters of a 3D object (especially a translucent or semi-transparent 3D object). The estimation of the SSS parameters may be based on generation of one or more texture maps such as a SSS translucency map or a SSS color map. The texture maps may be generated based on fitting of a multipole scattering model on a set of images of the 3D object. The 3D object may be illuminated by use of a set of polarized area-directional lighting patterns and a set of polarized spherical gradient lighting patterns, prior to the capturing of the set of images by use of multi-view image capturing devices. Each of the multi-view image capturing devices may be equipped with a polarizer such that cross polarization is achieved with respect to the polarized area-directional lighting patterns and the polarized spherical gradient lighting patterns. The illumination of the 3D object using these polarized lighting patterns and achievement of cross polarization may enable capturing of the set of images in diffuse lighting conditions. Such capturing may enable determination of subsurface color and translucency characteristics associated with the 3D object and generation of texture maps indicative of such characteristics based on the fitment of the multipole scattering model on the set of images. The color in the texture maps, generated based on the fitment, may indicate whether light, reflected from the surface of the 3D object, is captured, by the multi-view image capturing devices, based on reflection from the surface or subsurface scattering within the surface. The application of the generated texture maps may lead to an accurate rendering of a 3D model of the 3D object.

FIG. 1 is a diagram that illustrates an exemplary network environment for generation of subsurface scattering texture maps for 3D objects, in accordance with an embodiment of the disclosure. With reference to FIG. 1, there is shown a network environment 100. The network environment 100 includes an electronic apparatus 102, a rig 104, a set of light sources 106, a set of image capture devices 108, and a server 110. The rig 104 may be formed around a 3D physical space and may include the set of light sources 106 and the set of image capture devices 108. In at least one embodiment, the set of light sources 106 may include a first light source 106A, a second light source 106B, and an N$^{th}$ light source 106N. In at least one embodiment, the set of image capture devices 108 may include a first image capture device 108A, a second image capture device 108B, . . . , and an N$^{th}$ image capture device 108N. In at least one embodiment, the server 110 may include a database 112.

The electronic apparatus 102 may communicate with the set of light sources 106, the set of image capture devices 108, and the server 110, through one or more networks (such as, a communication network 114). There is further shown an object 116 (such as a human subject) inside the rig 104. The electronic apparatus 102 may control the set of light sources 106 and the set of image capture devices 108.

The electronic apparatus 102 may include suitable logic, circuitry, interfaces, and/or code that may be configured to control the set of light sources 106 to emit specific directional lighting patterns. The electronic apparatus 102 may be further configured to control the set of image capture devices 108 to capture a set of images of the object 116. Based on a fitting of a scattering model on the captured set of images, the electronic apparatus 102 may estimate subsurface scattering parameters in a form of texture maps that may be applied on a 3D model of the object 116. Examples of the electronic apparatus 102 may include, but not be limited to, a server, a volumetric capture controller, a 3D graphic engine, a 3D modelling or simulation engine, a volumetric studio controller, a tablet, a laptop, a computing device, a smartphone, a desktop, a mobile phone, or a consumer electronic (CE) device having a display.

The rig 104 may correspond to a physical device that may be used to mount the set of light sources 106 and the set of image capture devices 108 together to a single 3D-system to capture a set images of a scene (such as the set of images of the object 116) inside the rig 104. The rig 104 may be comprised of the plurality of structures. By way of example and not limitation, each structure (in triangular shape) may include at least one light source of the set of light sources 106 (such as the fifth light source 106E represented by a circle in FIG. 1) and at least one image capture device of the set of image capture devices 108 (such as the first image capture device 108A represented by a rectangle in FIG. 1). It may be noted that the rig 104, as shown in FIG. 1, is presented merely as an example. The rig 104 may be in different shapes or arrangement, without a deviation from scope of the disclosure.

Each light source of the set of light sources 106 may include suitable logic, circuitry, interfaces, and/or code that may be configured to receive control instructions from the electronic apparatus 102 to emit lighting patterns. In at least one embodiment, each light source of the set of light sources 106 may correspond to an electronically controlled lighting fixture. The light sources of the set of light sources 106 may be spatially arranged in the rig 104 such that the object 116 is illuminated from different viewpoints such as a left-hand side of the object 116, a right-hand side of the object 116, top of the object 116, bottom of the object 116, front of the object 116, or back of the object 116. Each light source of the set of light sources 106 may be coupled to one or more polarizers. The one or more polarizers may polarize light emitted by a corresponding light source along a plane of polarization. Examples of each light source of the set of light sources 106 may include, but are not limited to, an incandescent lamp, a halogen lamp, a Light Emitting Diode (LED) lamp, a metal halide lamp, a low-pressure sodium lamp, a fluorescent lamp/tube, a high intensity discharge lamp, or a neon lamp.

Each image capture device of the set of image capture devices 108 may include suitable logic, circuitry, interfaces, and/or code that may be configured to receive control instructions from the electronic apparatus 102 to capture a set of images of the object 116. The control instructions, received by the set of image capture devices 108 from the electronic apparatus 102, may include different imaging parameters such as field-of-view (FOV), zoom, focus, exposure, gain, orientation or tilt, ISO, brightness, and so on. The set of images may be captured based on the received imaging parameters and illumination of the object 116 by the set of light sources 106. The image capture devices of the set of image capture devices 108 may be spatially arranged in the rig 104 such that an image of the object 116 is captured from different viewpoints. Thus, the set of image capture devices 108 may capture a 360-degree view of the object 116. Each image capture device may be synchronized with other image capture device of the set of image capture devices 108. The set of image capture devices 108 may transmit the captured set of images of the object 116 to the electronic apparatus 102 based on reception of control instructions from the electronic apparatus 102.

In at least one embodiment, each image capture device of the set of image capture devices 108 may be a high-resolution still camera with burst capability. The image capture devices of the set of image capture devices 108 may capture fine skin details that may be used for generation of high-resolution mesh, normal maps, texture maps, height maps, tangent maps, and scattering maps. The image capture devices may provide optimum low light performance and have low sensor noise. Examples of each image capture device of the set of image capture devices 108 may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices.

The server 110 may include suitable logic, circuitry, interfaces, and/or code that may be configured to receive the set of images of the object 116 from the electronic apparatus 102 or the database 112 (as a query response). In at least one embodiment, the server 110 may determine, based on the set of images of the object 116 (i.e., head of the human subject), a 3-Dimensional (3D) facial geometry associated with the human subject to construct a 3D mesh of the head of the human subject. The server 110 may be further configured to generate a set of texture maps (for example, a color map and a translucency map) based on fitment of a scattering model on the set of images. The server 110 may apply one or more texture maps of the set of texture maps on the 3D mesh to generate a photo-realistic relightable model of the head of the human subject. Thereafter, the server 110 may transmit the photo-realistic relightable model to the electronic apparatus 102 for rendering. The server 110 may execute operations through web applications, cloud applications, HTTP requests, repository operations, file transfer, or the like. Example implementations of the server 110 may include, but may not be limited to, a database server, a file server, a web server, an application server, a mainframe server, a cloud computing server, or a combination thereof.

In at least one embodiment, the server 110 may be implemented as a plurality of distributed cloud-based resources by use of several technologies that are well known to those ordinarily skilled in the art. A person with ordinary skill in the art will understand that the scope of the disclosure may not be limited to the implementation of the server 110 and the electronic apparatus 102 as separate entities. In certain embodiments, the functionalities of the server 110 can be incorporated in its entirety or at least partially in the electronic apparatus 102, without a departure from the scope of the disclosure.

The database 112 may include suitable logic, interfaces, and/or code that may be configured to store the set of images of the object 116 captured by the set of image capture devices 108. The database 112 may receive a query from the electronic apparatus 102 or the server 110 for the set of images of the object 116. Based on the received query, the database 112 may generate a query response that includes the queried set of images of the object 116. The server 110 may transmit the query response to the electronic apparatus 102. The database 112 may be derived from data off a relational or non-relational database or a set of comma-separated values (csv) files in conventional or big-data storage. The database 112 may be stored or cached on a device, such as the electronic apparatus 102 or the server 110. In an embodiment, the database 112 may be hosted on a plurality of servers stored at same or different locations. The operations of the database 112 may be executed using hardware including a processor, a microprocessor (e.g., to perform or control performance of one or more operations), a field-programmable gate array (FPGA), or an application-specific integrated circuit (ASIC). In some other instances, the database 112 may be implemented using software.

The communication network 114 may include a communication medium through which the electronic apparatus 102, the set of light sources 106, the set of image capture devices 108, and the server 110, may communicate with each other. The communication network 114 may be a wired or wireless communication network. Examples of the communication network 114 may include, but may not be limited to, Internet, a Wireless Fidelity (Wi-Fi) network, a Personal Area Network (PAN), a Local Area Network (LAN), or a Metropolitan Area Network (MAN). Various devices in the network environment 100 may be configured to connect to the communication network 114, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The object 116 may be an animate or an inanimate object and may be present in 3D physical space inside the rig 104. The animate object may correspond to a living object that may possess a quality or an ability of motion whereas the inanimate object may correspond to a non-living object that may lack the quality or the ability of motion. Examples of object 116 may include, but are not limited to, a human subject, an animal, or any non-living object.

In operation, the electronic apparatus 102 may be configured to control the set of light sources 106 to generate a set of lighting patterns. The set of light sources 106 may be controlled based on reception of a user input. The user input may be indicative of an instruction to emit the set of lighting patterns. In accordance with an embodiment, the set of light sources, i.e., each of the first light source 106A, the second light source 106B . . . and the Nth light source 106N may be controlled to generate a set of area-directional lighting patterns. For example, the area light may be simulated by LEDs installed at different locations on the rig 104. The LEDs may be activated in certain numbers (e.g., 11 LEDs) of LEDs as a group on the rig 104 on one side (front, back, left, right) to simulate the presence of the area-directional lighting pattern. The same set of light sources, i.e., each of the first light source 106A, the second light source 106B . . . and the $N^{th}$ light source 106N may be further controlled to generate a set of spherical gradient lighting patterns.

In accordance with an embodiment, the set of light sources 106 may emit, at each time-instant, a lighting pattern of the set of lighting patterns. Thus, lighting patterns of the set of lighting patterns may be generated sequentially. For example, at a first time instant, the set of light sources 106 may emit a first lighting pattern of the set of lighting patterns. Thereafter, at a second time instant, the set of light sources 106 may emit a second lighting pattern of the set of lighting patterns.

In accordance with an embodiment, each light source of the set of light sources may be coupled to a polarizer that may polarize light emitted by a corresponding light source. The light emitted by the corresponding light source may be polarized along a first plane of polarization. For example, the polarizer may vertically or horizontally polarize the emitted light.

The set of area-directional lighting patterns and the set of spherical gradient lighting patterns may illuminate the object 116. Based on the illumination, polarized light (i.e., the set of area-directional lighting patterns and the set of spherical gradient lighting patterns) may be incident on a surface of the object 116 and may be reflected or scattered from the surface after contacting the surface. Further, polarized light incident on some regions of the surface may be absorbed, scattered at the subsurface level (beneath the surface), and transmitted from the surface after reemergence from beneath the surface. The reflected light, the scattered light, and the transmitted light (scattered at the subsurface level) may be required to be captured.

The electronic apparatus 102 may be further configured to control the set of image capture devices 108 to capture a set of images of the object 116 that may be illuminated by the generated set of lighting patterns (i.e., the set of area-directional lighting patterns and the set of spherical gradient lighting patterns). Once the set of lighting patterns are emitted by the set of light sources 106 and the object 116 is illuminated, the set of image capture devices 108 may be controlled to capture the set of images of the object 116. The set of images may include multiple subsets of images. Each subset of images of the set of images may be captured by an image capture device of the set of image capture devices 108 from a particular viewpoint associated with an object. Further, each image of each subset of images may be captured based on illumination of the object 116 by a lighting pattern of the set of lighting patterns. For example, a first subset of images may be captured from a first viewpoint (either of a top view, a right-side view, a left-side view, and so on) by a first image capture device of the set of image capture devices 108 when the object 116 is illuminated by the set of lighting patterns. Similarly, a $N^{th}$ subset of images may be captured from an $N^{th}$ viewpoint by an $N^{th}$ image capture device of the set of image capture devices 108 when the object 116 is illuminated by the set of lighting patterns.

In accordance with an embodiment, each image capture device of the set of image capture devices 108 may be coupled to a polarizer that may polarize light captured by a corresponding image capture device. The captured light may be polarized along a second plane of polarization, which may be perpendicular to the first plane of polarization. The polarizers coupled to the set of image capture devices 108 may filter captured light such that the filtered light is cross polarized with respect to emitted light filtered by the polarizers coupled to the set of light sources 106. For example, if the polarizer coupled to a light source of the set of light sources 106 is a vertical polarizer (that may cause the light emitted from the light source to be vertically polarized), the polarizer coupled to an image capture device of the set of image capture devices 108 may be a horizontal polarizer. On the other hand, if the polarizer coupled to the light source is a horizontal polarizer (that may cause light emitted from the light source to be horizontally polarized), the polarizer included in the image capture device may be a vertical polarizer. The cross polarization may block light that may be reflected or scattered from the surface of the object 116. However, light transmitted from the surface (i.e., light that reemerges from the surface) of the object 116, after getting absorbed at the surface and having scattered at the subsurface level (beneath the surface), may be captured by the set of image capture devices 108. This may be because the scattering of polarized absorbed light at the subsurface level may cause the polarized absorbed light to become unpolarized before reemerging from the surface. The pixels of each image of the set of images, captured by the set of image capture devices 108, may indicate intensity of the transmitted light.

The electronic apparatus 102 may be further configured to determine pixel-level offset information based on application of an image registration operation on the set of images. The pixel-level offset information may be required to be determined if the object 116 is an animate object (such as a human subject). For example, the object 116 may be a human subject. For determination of subsurface scattering parameters associated with facial skin, a set of images of the head of the human subject may be captured. During the capture, there is a likelihood of motion or a movement of the head. The head motion may lead to an appearance of an offset between pixels across images of the set of images that may be captured prior to and after the motion of the head. The images may be captured by the same image capture device of the set of image capture devices 108 or different image capture devices of the set of image capture devices 108 when the object 116 is illuminated by the same lighting pattern or different lighting patterns of the set of lighting patterns.

In accordance with an embodiment, the pixel-level offset information may be determined based on the image registration operation. The image registration operation may involve determination of an optical flow vector for each image of the set of images. Based on the optical flow vector, motion of the object 116 may be determined and tracked across images of the set of images. For example, the optical flow vector may indicate a relative motion of pixels of a second image of the set of images with respect to pixels of a first image of the set of images. The second image may be captured after capturing of the first image or at same time-instance of capturing of the first image. In some scenarios, the first image and the second image may be captured using the same image capture device of the set of image capture devices 108 (i.e., the first image and the second image may belong to the same subset of images). In other scenarios, the first image and the second image may be captured using different image capture devices of the set of image capture devices 108 (i.e., the first image and the second image may belong to the different subsets of images).

Based on the optical flow vector, a correction that may be required to be applied on the second image may be determined. Similarly, corrections required for each of a third image, . . . , and an $N^{th}$ image of the set of images may be determined. The pixel-level offset information may include the corrections that may be required to be applied on each image (apart from the first image) of the set of images.

The electronic apparatus 102 may be further configured to generate a set of corrected images based on the pixel-level offset information and the set of images. The generation of the set of corrected images may be based on application of the determined corrections on each image of the set of images. For example, after an application of the correction (determined based on the relative motion of the pixels of the second image with respect to the pixels of the first image) on the second image, a corrected second image may be generated. Similarly, a corrected third image may be generated based on an application on the third image of a correction determined based on a relative motion of the pixels of the third image with respect to pixels of the corrected second image. Further, a corrected $N^{th}$ image may be generated based on an application, on the $N^{th}$ image, of a correction determined based on a relative motion of the pixels of the $N^{th}$ image with respect to pixels of a corrected $(N-1)^{th}$ image.

The electronic apparatus 102 may be further configured to estimate subsurface scattering parameters in a form of texture maps corresponding to a 3D mesh of the object 116. The estimation may be performed based on a fitting of a scattering model on the set of corrected images. Based on the set of corrected images, the 3D mesh of the object 116 may be constructed. The construction of the 3D mesh may include construction of a 3D point cloud geometry that corresponds to the object 116. The 3D point cloud geometry may be constructed based on application of photogrammetry on the set of corrected images of the object 116, and additional information associated with the object 116 (such as color information). Thereafter, 3D points of the 3D point cloud geometry may be processed to construct the 3D mesh. The 3D mesh may be a geometric data structure that includes a set of connected polygons such as triangles (whose vertices may correspond to the 3D points of the 3D point cloud geometry). The surface of the 3D mesh may represent the surface of the object 116.

Each 3D point on the surface of the 3D mesh may correspond to one or more pixels of one or more corrected images of the set of corrected images. Thus, each 3D point may be represented by one or more intensity values of the one or more pixels. The one or more intensity values may be obtained based on capturing of the corresponding 3D point from one or more viewpoints, when the object 116 is illuminated by one or more lighting patterns of the set of lighting patterns. The electronic apparatus 102 may fit the scattering model on each pixel of a corrected image of the set of corrected images. Each pixel of the corrected image may correspond to a 3D point on the surface of the 3D mesh. Based on the fitment of the scattering model on each pixel, a first subsurface scattering parameter may be estimated for the 3D point. Similarly, the scattering model may be fitted on pixels of corrected images of the set of corrected images that may correspond to other 3D points on the surface of the 3D mesh. Based on such fitting, the first subsurface scattering parameter may be estimated for each of the other 3D points of the 3D mesh.

The electronic apparatus 102 may be configured to generate a first texture map based on the estimated first subsurface scattering parameter of all the 3D points on the 3D mesh. Similarly, the electronic apparatus 102 may generate other texture maps based on other subsurface scattering parameters, which may be generated based on the fitment of the scattering model on each pixel of each corrected image of the set of corrected images. In accordance with an embodiment, the electronic apparatus 102 may be configured to apply each texture map on the 3D mesh for photorealistic rendering of a 3D model of the object 116.

Figure 2:
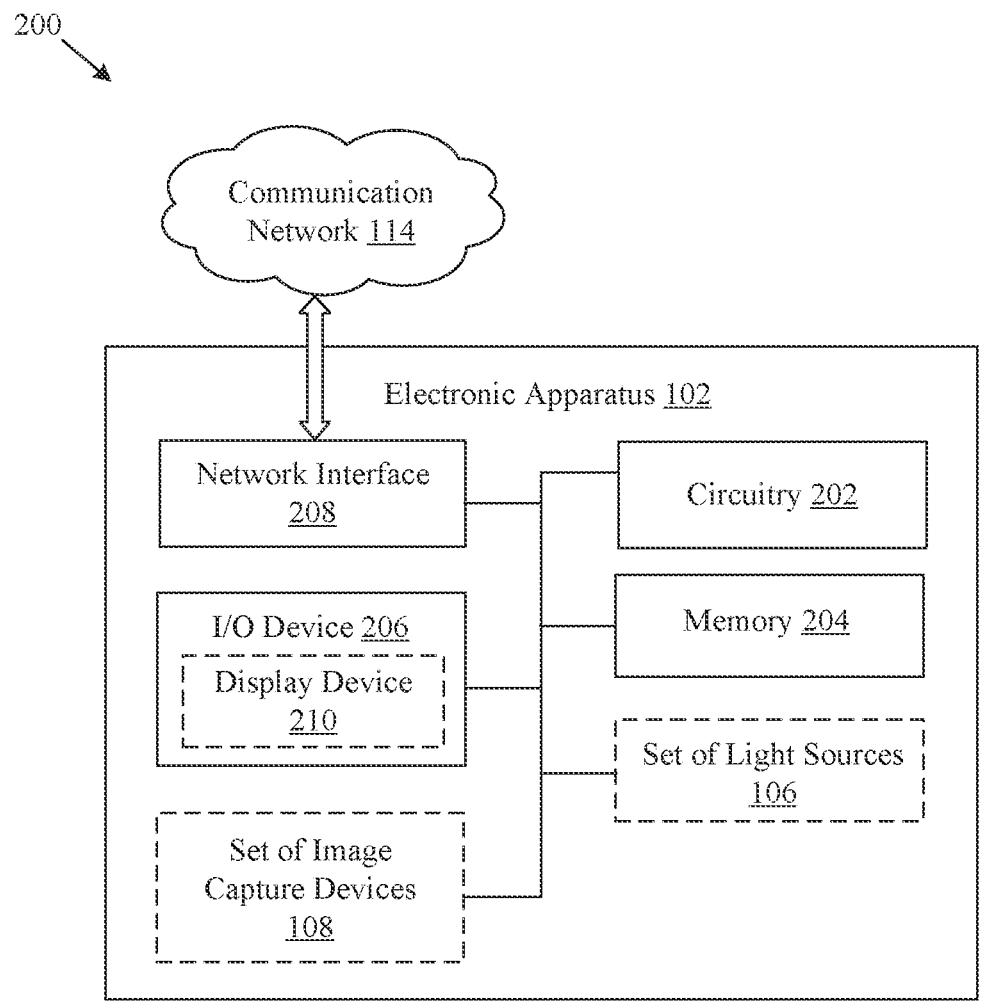
FIG. 2 is a block diagram that illustrates an exemplary electronic apparatus of FIG. 1, for generation of subsurface scattering texture maps for 3D objects, in accordance with an embodiment of the disclosure.

FIG. 2 is a block diagram that illustrates an exemplary electronic apparatus of FIG. 1, for generation of subsurface scattering texture maps for 3D objects, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202, a memory 204, an input/output (I/O) device 206, a network interface 208, the set of light sources 106, and the set of image capture devices 108. In at least one embodiment, the I/O device 206 may also include a display device 210. The circuitry 202 may be communicatively coupled to the memory 204, the I/O device 206, the network interface 208, the set of light sources 106, and the set of image capture devices 108, via wired or wireless communication of the electronic apparatus 102.

The circuitry 202 may include suitable logic, circuitry, and interfaces that may be configured to execute program instructions associated with different operations to be executed by the electronic apparatus 102. The operations may include controlling the set of light sources 106 for generation of a set of lighting patterns, controlling the set of image capture devices 108 to capture a set of images of an object (such as the object 116) that may be illuminated by the generated set of lighting patterns, determination of pixel-level offset information based on an application of an image registration operation on the set of images, generation of a set of corrected images based on the pixel-level offset information and the set of images, and estimation of subsurface scattering parameters in a form of texture maps based on a fitting of a scattering model on the set of corrected images. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a central processing unit (CPU), a Graphics Processing Unit (GPU), a microcontroller, a Reduced Instruction Set Computing (RISC) processor, an Application-Specific Integrated Circuit (ASIC) processor, a Complex Instruction Set Computing (CISC) processor, and/or other computing circuits.

The memory 204 may include suitable logic, circuitry, interfaces, and/or code that may be configured to store the program instructions to be executed by the circuitry 202. The program instructions stored on the memory 204 may enable the circuitry 202 to execute operations of the circuitry 202 (the electronic apparatus 102). In an embodiment, the memory 204 may be configured to store the set of images of the object 116 captured by the set of image capture devices 108. The memory 204 may be further configured to store a 3D mesh of the object 116, the set of captured images, the set of corrected images, the estimated subsurface scattering parameters, and the texture maps. Examples of implementation of the memory 204 may include, but are not limited to, Random Access Memory (RAM), Read Only Memory (ROM), Hard Disk Drive (HDD), Electrically Erasable Programmable Read-Only Memory (EEPROM), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a user input indicative of an instruction (to the set of light sources 106) to emit the set of lighting patterns to illuminate the object 116. The I/O device 206 may further receive a user input indicative of an instruction (to the set of image capture devices 108) to capture the set of images of the object 116 based on the illumination of the object 116. The I/O device 206 may further receive user inputs to generate a 3D mesh of the object 116 and the texture maps indicative of subsurface scattering parameters. Examples of the I/O device 206 may include, but are not limited to, a touch screen, a keyboard, a mouse, a joystick, a microphone, the display device 210, and a speaker.

The I/O device 206 may include the display device 210. The display device 210 may include suitable logic, circuitry, and interfaces that may be configured to receive inputs from the circuitry 202 to render, on a display screen, the captured set of images of the object 116, the set of corrected images, the subsurface scattering parameters, and the texture maps. In at least one embodiment, the display screen of the display device 210 may be at least one of a resistive touch screen, a capacitive touch screen, or a thermal touch screen. The display device 210 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate a communication between the circuitry 202, the set of light sources 106, the set of image capture devices 108, and the server 110, via the communication network 114. The network interface 208 may be implemented by use of various known technologies to support wired or wireless communication of the electronic apparatus 102 with the communication network 114. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a near field communication protocol, and a wireless pear-to-pear protocol.

The functions or operations executed by the electronic apparatus 102, as described in FIG. 1, may be performed by the circuitry 202. Operations executed by the circuitry 202 are described in detail, for example, in FIG. 3.

Figure 3:
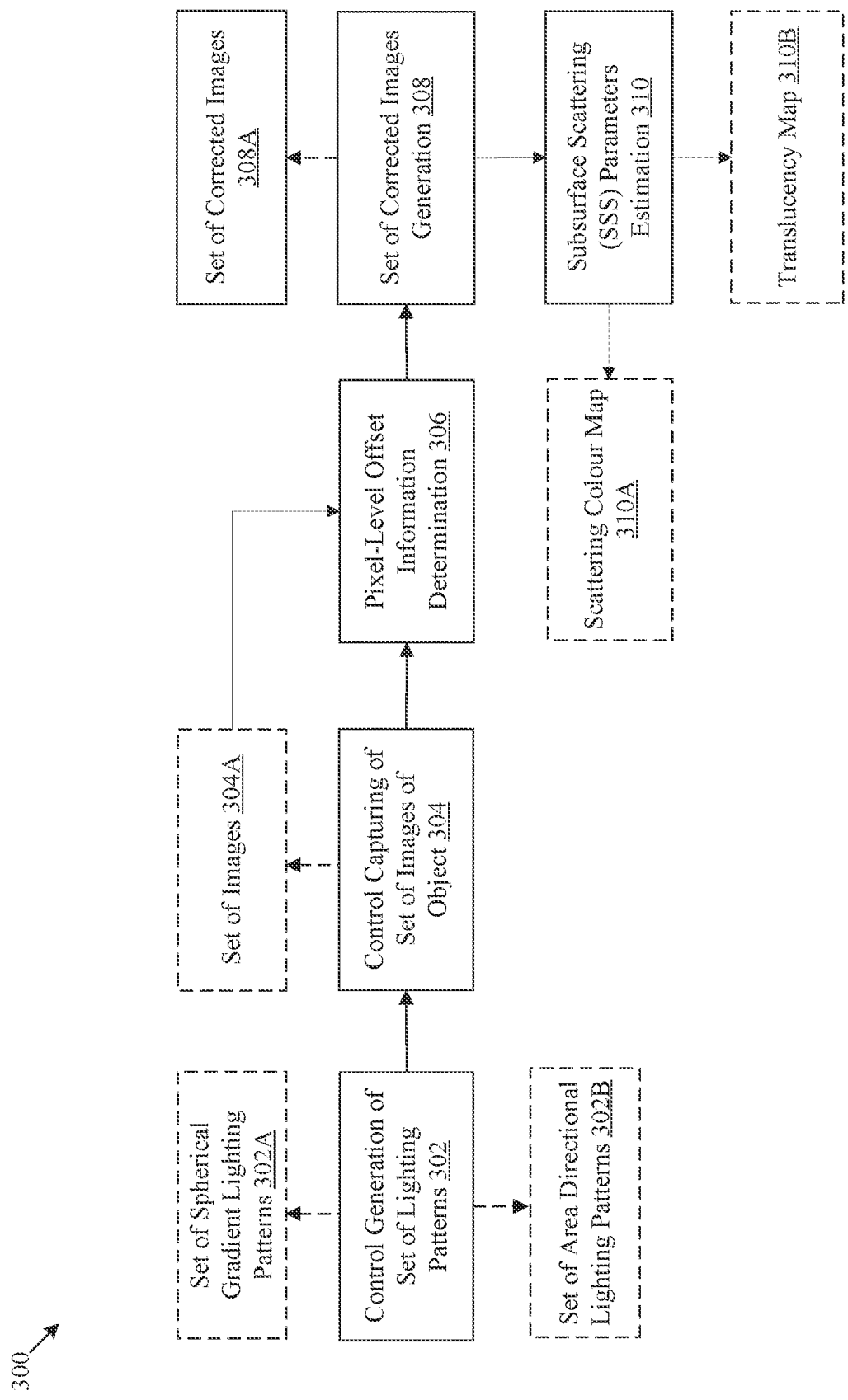
FIG. 3 is a diagram that illustrates an exemplary execution pipeline for generation of subsurface scattering texture maps for 3D objects, in accordance with an embodiment of the disclosure.

FIG. 3 is a diagram that illustrates an exemplary execution pipeline for generation of subsurface scattering texture maps for 3D objects, in accordance with an embodiment of the disclosure. FIG. 3 is explained in conjunction with elements from FIG. 1 and FIG. 2. With reference to FIG. 3, there is shown an exemplary pipeline 300. The exemplary pipeline 300 may include a set of operations (for example, operations 302 to 310) that may be executed by one or more components of FIG. 1, such as, the circuitry 202 of the electronic apparatus 102. The set of operations may be performed to estimate subsurface scattering parameters and generate texture maps indicative of the estimated subsurface scattering parameters.

At 302, a generation of a set of lighting patterns may be controlled. In at least one embodiment, the circuitry 202 may be configured to control a set of light sources (such as the set of light sources 106) to generate the set of lighting patterns. The generated set of lighting patterns may include a set of spherical gradient lighting patterns 302A and a set of area-directional lighting patterns 302B. The light sources may be controlled to generate the set of area-directional lighting patterns 302B. Thus, each of the first light source 106A, the second light source 106B, ... the $N^{th}$ light source 106N may collectively emit the set of area-directional lighting patterns 302B. Similarly, the light sources may be controlled to generate the set of spherical gradient lighting patterns 302A.

The set of light sources 106 may illuminate the object 116 from multiple directions, i.e., multiple viewpoints (such as a top-view, a front-view, a right-side view, or a left-side view) of the object 116. In accordance with an embodiment, the set of light sources 106 may generate a set of polarized lighting patterns to illuminate the object 116 from multiple viewpoints. The set of polarized lighting patterns may be generated by use of a first polarizer filter coupled to each light source of the set of light sources 106. Each spherical gradient lighting pattern of the set of spherical gradient lighting patterns 302A and each area-directional lighting pattern of the set of area-directional lighting patterns 302B may be polarized, by use of a first polarizer filter, along a first plane of polarization (horizontal or vertical plane) or a first direction (clockwise or anticlockwise) of polarization. The first polarizer filter may linearly (horizontally or vertically) or circularly (left-handed or right-handed) polarize a corresponding lighting pattern of the set of lighting patterns.

At 304, a capturing of a set of images 304A may be controlled. In at least one embodiment, the circuitry 202 may be configured to control a set of image capture devices (such as the set of image capture devices 108) to capture the set of images 304A of the object 116 that may be illuminated by the generated set of lighting patterns (i.e., the set of spherical gradient lighting patterns 302A and the set of area-directional lighting patterns 302B). Once the object 116 is illuminated, the set of image capture devices 108 may be controlled to capture the set of images 304A of the object 116. Each image capture device of the set of image capture devices 108 may be controlled to capture a subset of images of the set of images 304A. For example, a first image capture device of the set of image capture devices 108 may be controlled to capture a first subset of images of the set of images 304A. Similarly, an $N^{th}$ image capture device of the set of image capture devices 108 may be controlled to capture an $N^{th}$ subset of images of the set of images 304A.

The subset of images captured by each image capture device of the set of image capture devices 108 may be associated with a viewpoint of the object 116. For example, the first image capture device may capture the first subset of images from a first viewpoint of the object 116. Similarly, the $N^{th}$ image capture device may capture the $N^{th}$ subset of images from an $N^{th}$ viewpoint of the object 116. Thus, the set of images 304A may include images captured from different viewpoints (such as top-view, front-view, right-side view, or left-side view) of the object 116.

Each image of the subset of images may be captured based on illumination of the object 116 with a lighting pattern of the set of lighting patterns. At a first time-instant, the first image capture device may capture a first image of the first subset of images from a first viewpoint based on illumination of the object 116 by a first lighting pattern of the set of lighting patterns. Similarly, at an $N^{th}$ time-instant, the first image capture device may capture an $N^{th}$ image of the first subset of images from the first viewpoint based on illumination of the object 116 by an $N^{th}$ lighting pattern of the set of lighting patterns.

In accordance with an embodiment, the image capture devices of the set of image capture devices 108 may be synchronized with each other. Therefore, at same time-instant, each image capture device of the set of image capture devices 108 may capture an image from a viewpoint, when the object 116 is illuminated by a lighting pattern of the set of lighting patterns. After an $N^{th}$ time-instant, each image capture device of the set of image capture devices 108 may capture a subset of images from each viewpoint.

In accordance with an embodiment, each image capture device of the set of image capture devices 108 may be coupled to a second polarizer filter that may polarize light captured by a lens of a corresponding image capture device. The captured light may be polarized along a second plane of polarization or a second direction of polarization. The second plane of polarization may be perpendicular to the first plane of polarization (i.e., if the first plane is vertical, then the second plane is horizontal, and vice-versa). The second direction may be opposite to the first direction of polarization (i.e., if the first direction is left-hand (anticlockwise), then the second direction is right-hand (clockwise). Each light source of the set of light sources 106 may emit the set of lighting patterns, which may be polarized along the first plane of polarization or the first direction of polarization. The set of polarized lighting patterns may be incident on the surface of the object 116. Polarized light incident on the surface may be scattered or reflected from the surface of the object 116 or absorbed into the surface of the object 116 after contacting the surface. The absorbed light may be scattered at one or more subsurface levels (beneath the surface) due to irregularities at the one or more subsurface levels. The irregularities may cause the absorbed light to be reflected and/or refracted at one or more subsurface levels, causing the reflected and/or refracted absorbed light to reemerge from the object's surface. The reemerged light may become unpolarized due to subsurface scattering at the one or more subsurface levels.

Each image capture device of the set of image capture devices 108 may capture the polarized light that may have scattered or reflected from the surface of the object 116 and the unpolarized light that may have reemerged after scattering at the one or more subsurface levels. The captured polarized light may be blocked due to cross polarization, as the second polarizer may further polarize the captured polarized light (initially polarized along the first plane of polarization or the first direction of polarization) along the second plane of polarization (which is perpendicular to the first plane of polarization) or the second direction of polarization (which is opposite to the first direction of polarization). However, the captured unpolarized light may pass through the lens of each image capture devices of the set of image capture devices 108 and contribute to intensities of pixels of each image of the set of images 304A. The usage of area-directional lighting patterns may enable the circuitry 202 to distinguish between the captured polarized light (reflected/scattered from the surface) and the captured unpolarized light (scattered at the one or more subsurface levels) from the set of images 304A captured by the set of image capture devices 108.

At 306, pixel-level offset information associated with the set of images 304A may be determined. In at least one embodiment, the circuitry 202 may be configured to determine the pixel-level offset information based on application of an image registration operation on the set of images 304A. The pixel-level offset information may be indicative of pixel-wise differences between at least two images of the set of images 304A. The at least two images may be captured at same time-instant from different viewpoints (i.e., different image capture devices of the set of image capture devices 108) when the object 116 is illuminated by a lighting pattern of the set of lighting patterns. Alternatively, the at least two images may be captured at different time-instants from different viewpoints when the object 116 is illuminated by different lighting patterns of the set of lighting patterns. Further, the at least two images may be captured at different time-instants from the same viewpoint (i.e., same image capture device of the set of image capture devices 108) when the object 116 is illuminated by the different lighting patterns. The differences may appear due to a movement or motion of the object 116 during the capture of the at least two images.

For example, the object 116 may be the head of a human subject. The set of images 304A may include a first image and a second image, which may be captured at a same time instant or at different time instants. Due to movement of the head of the human subject, there may be differences between pixels of the first image and the second image. In accordance with an embodiment, the circuitry 202 may compute a dense optical flow vector for each image of the set of images 304A. The dense optical flow vector may be indicative of a relative motion of pixels between a first image of the set of images 304A and the second image of the set of images 304A. Based on the relative motion, the human subject (i.e., the object 116) may be tracked across the first image and the second image, and the difference (i.e., the pixel offset information) between the first image and the second image may be determined.

The circuitry 202 may be further configured to determine a correction that may be required to be applied on the second image based on the dense optical flow vector. The pixel-level offset information may include the determined correction. In accordance with an embodiment, the correction may correspond to a transformation to be applied on the second image such that the difference between the first image and the second image is minimized and a pixel-to-pixel (or spatial) correspondence between the first image and the second image is established. The transformation may be a rigid transformation or an affine transformation. It may be noted that the first image is a correct image that may be used as a reference image for transformation of the second image such that a corrected second image is generated. Similarly, corrections may be determined for the other images of the set of images 304A to minimize differences between a reference image (such as the first image or any other image of the set of images 304A that has been corrected) and the other images of the set of images 304A to be corrected. The corrections may be included in the pixel-level offset information.

At 308, a set of corrected images 308A may be generated. In at least one embodiment, the circuitry 202 may be configured to generate the set of corrected images 308A based on the pixel-level offset information (i.e., the determined correction included in the pixel-level offset information) and the set of images 304A (such as the first image or any other image that may be used as a reference image). The corrected second image may be generated based on an application of the correction (i.e., the transformation) on the second image. The set of corrected images 308A may include the corrected second image. The difference between the first image and the corrected second image may be minimal, close to zero, or less than a threshold. In some scenarios, the corrected second image may be identical to the first image. It may be noted that each of the other images (apart from the first image and the second image) of the set of images 304A may be similarly corrected for the generation of the set of corrected images 308A.

In accordance with an embodiment, the image registration operation may include the computation of the dense optical flow vector, the determination of the correction, and the application of the correction. The set of corrected images 308A may be generated based on the application of the image registration operation on the set of images 304A.

At 310, subsurface scattering parameters may be estimated. In at least one embodiment, the circuitry 202 may be configured to estimate the subsurface scattering parameters in a form of texture maps corresponding to a 3D mesh of the object 116. The estimation of the subsurface scattering parameters may be performed based on a fitting of a scattering model on the set of corrected images 308A. The texture maps may include a first texture map and a second texture map. The first texture map may be a scattering color map 310A of the object 116. The second texture map may be a translucency map 310B of the object 116. The circuitry 202 may apply the texture maps on the 3D mesh to render a photorealistic 3D model of the object 116.

In accordance with an embodiment, the circuitry 202 may be configured to acquire depth information associated with the object 116. The depth information may be obtained using one or more depth sensors (not shown) in the rig 104 that may capture the depth information from the different viewpoints. The 3D mesh of the object 116 may be constructed based on the set of corrected images 308A and the depth information. The 3D mesh may be a graphical model that defines a reconstructed surface (shape and geometry) of the object 116 using a set of polygons (such as triangles). The construction of the 3D mesh may include estimation of intrinsic and/or extrinsic parameters associated with each image capture device of the set of image capture devices 108, extraction of a set of features from each image of the set of corrected images 308A, feature matching based on features of candidate image pairs of the set of corrected images 308A, creation of 3D points in 3D space based on the matching features of each candidate image pair, generation of a 3D point cloud based on the 3D points, and a meshing operation on the 3D point cloud. The meshing operation may lead to an initial 3D mesh. Thereafter, the initial 3D mesh may be refined for removal of undesirable structures, deformations, or irregularities on surface of the initial 3D mesh. The refined 3D mesh may correspond to the 3D mesh of the object 116. Each 3D point (vertex) of the 3D mesh may be represented by one or more pixels in one or more images of the set of corrected images 308A.

In accordance with an embodiment, the circuitry 202 may be further configured to generate the texture maps that correspond to the constructed 3D mesh. The texture maps are UV coordinate maps that may be indicative of subsurface scattering parameters associated with each vertex of the 3D mesh. The generation of the texture maps may be based on the fitment of the scattering model on each pixel of each corrected image of the set of corrected images 308A. The scattering model may be a multipole lighting model that may be parameterized based on one or more properties associated with the surface of the object 116. The one or more properties may include a scattering coefficient, an absorption coefficient, a relative index of refraction, and a phase function.

Each vertex of 3D mesh (each 3D point on the surface of the object 116) may correspond to one or more pixels of one or more corrected images of the set of corrected images 308A. Based on fitment of the scattering model on intensity of each of the one or more pixels and a direction of incidence of light on the surface represented by each of the one or more pixels, scattering color or translucency associated with the corresponding vertex may be estimated. The scattering color associated with all vertices of the 3D mesh may be indicated in the scattering color map 310A. Similarly, translucency associated with all vertices of the 3D mesh may be indicated in the translucency map 310B. The circuitry 202 may apply the scattering color map 310A or the translucency map 310B on the 3D mesh of the object 116 to render a photorealistic 3D model of the object 116.

Figure 4:
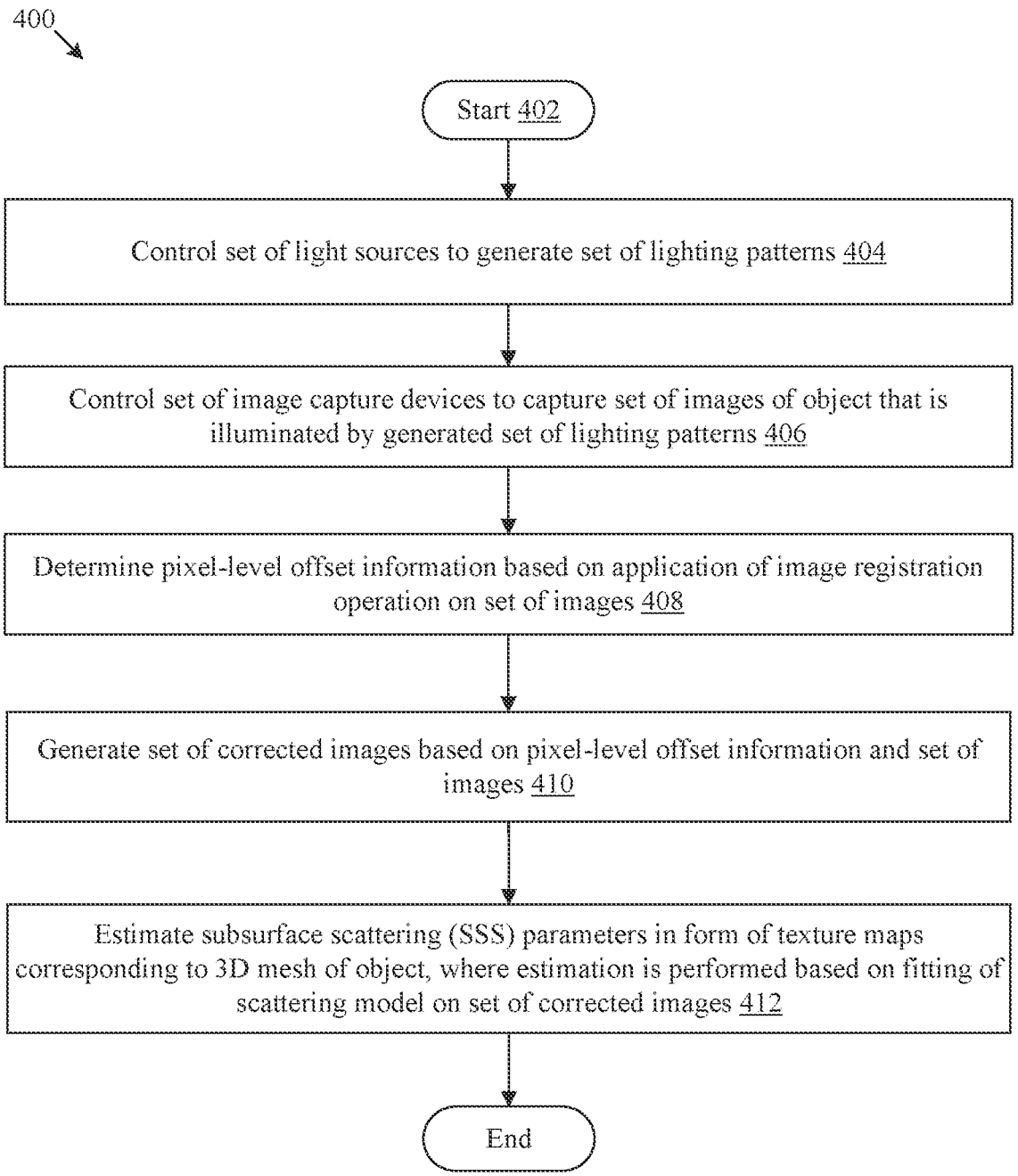
FIG. 4 is a flowchart that illustrates operations for an exemplary method for generation of subsurface scattering texture maps for 3D objects, in accordance with an embodiment of the disclosure.

FIG. 4 is a flowchart that illustrates operations for an exemplary method for generation of subsurface scattering texture maps for 3D objects, in accordance with an embodiment of the disclosure. FIG. 4 is explained in conjunction with elements from FIGS. 1, 2, and 3. With reference to FIG. 4, there is shown a flowchart 400. The operations from 402 to 412 may be implemented by any computing system, such as, by the electronic apparatus 102 of FIG. 1 or the circuitry of FIG. 2. The operations may start at 402 and may proceed to 404.

At 404, a set of light sources (for example, the set of light sources 106) may be controlled to generate a set of lighting patterns. In at least one embodiment, the circuitry 202 may be configured to control the set of light sources 106 to generate the set of lighting patterns. The details of controlling of the set of light sources 106 for the generation of the set of lighting patterns are described, for example, in FIG. 1 and FIG. 3.

At 406, a set of image capture devices (for example, the set of image capture devices 108) may be controlled to capture a set of images of an object (for example, the object 116) that may be illuminated by the generated set of lighting patterns. In at least one embodiment, the circuitry 202 may be configured to control the set of image capture devices to capture the set of images of the object 116 that may be illuminated by the generated set of lighting patterns. The details of controlling of the set of image capture devices for the capturing of the set of images of the object 116 are described, for example, in FIG. 1 and FIG. 3.

At 408, pixel-level offset information may be determined based on application of an image registration operation on the set of images. In at least one embodiment, the circuitry 202 may be configured to determine the pixel-level offset information based on application of the image registration operation on the set of images. The details of determination of the pixel-level offset information based the image registration operation, are described, for example, in FIG. 1 and FIG. 3.

At 410, a set of corrected images may be generated based on the pixel-level offset information and the set of images. In at least one embodiment, the circuitry 202 may be configured to generate the set of corrected images based on the pixel-level offset information and the set of images. The details of generation of the set of corrected images, are described, for example, in FIG. 1 and FIG. 3.

At 412, subsurface scattering (SSS) parameters in a form of texture maps corresponding to a 3D mesh of the object 116 may be estimated. In at least one embodiment, the circuitry 202 may be configured to estimate the SSS parameters in the form of texture maps corresponding to the 3D mesh of the object 116. The estimation may be performed based on a fitting of a scattering model on the set of corrected images. The details of estimation of the subsurface scattering parameters are described, for example, in FIG. 1 and FIG. 3. Control may pass to end.

Although the flowchart 400 is illustrated as discrete operations, such as 404, 406, 408, 410, and 412, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic apparatus (such as the electronic apparatus 102). The computer-executable instructions may cause the machine and/or computer to perform operations that include controlling a set of light sources (such as the set of light sources 106) to generate a set of lighting patterns. The operations may further include controlling a set of image capture devices (such as the set of image capture devices 108) to capture a set of images of an object (such as the object 116) that may be illuminated by the generated set of lighting patterns. The operations may further include determination of pixel-level offset information based on an application of an image registration operation on the set of images. The operations may further include generation of a set of corrected images based on the pixel-level offset information and the set of images. The operations may further include estimation of subsurface scattering (SSS) parameters in a form of texture maps corresponding to a 3D mesh of the object 116. The estimation may be performed based on a fitting of a scattering model on the set of corrected images.

Exemplary aspects of the disclosure may include an electronic apparatus (such as, the electronic apparatus 102 of FIG. 1) that may include circuitry (such as the circuitry 202). In an embodiment, the circuitry 202 may be configured to control a set of light sources (such as the set of light sources 106) to generate a set of lighting patterns. The set of lighting patterns may include a set of spherical gradient lighting patterns and a set of area-directional lighting patterns. The circuitry 202 may be further configured to control a set of image capture devices (such as the set of image capture devices 108) to capture a set of images of an object (such as the object 116) that may be illuminated by the generated set of lighting patterns. Each image capture device of the set of image capture devices may be controlled to capture a subset of images of the set of images. The subset of images may be associated with a viewpoint of the object. Each image of the subset of images may be captured based on an illumination of the object with a lighting pattern of the set of lighting patterns. A plane of polarization associated with a polarizer coupled to each light source of the set of light sources 106 may be perpendicular to a plane of polarization associated with a polarizer coupled to each image capture device of the set of image capture devices 108. The circuitry 202 may be further configured to determine pixel-level offset information based on application of an image registration operation on the set of images. The circuitry 202 may be further configured to generate a set of corrected images based on the pixel-level offset information and the set of images. The circuitry 202 may be further configured to estimate subsurface scattering parameters in a form of texture maps corresponding to a 3D mesh of the object. The estimation may be performed based on a fitting of a scattering model on the set of corrected images. The scattering model may be a parameterized model that may be parameterized based on one or more properties associated with a surface of the object 116. The properties include a scattering coefficient, an absorption coefficient, a relative index of refraction, and a phase function. A first texture map of the texture maps may be a scattering color map of the object 116, and a second texture map of the texture maps may be a translucency map of the object 116.

In accordance with an embodiment, the circuitry 202 may be further configured to compute a dense optical flow vector for each image of the set of images. The dense optical flow vector may be indicative of a relative motion of pixels between a first image of the set of images and a second image of the set of images. The circuitry 202 may be further configured to determine a correction that may be required to be applied on the second image based on the dense optical flow vector. The pixel-level offset information may include the correction. The circuitry 202 may be further configured to generate a corrected second image based on an application of the correction on the second image.

The set of corrected images may include the corrected second image. The image registration operation may include the computation of the dense optical flow vector, the determination of the correction, and the application of the correction.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic apparatus, comprising:
   circuitry configured to:
   control a set of light sources to generate a set of lighting patterns;
   control a set of image capture devices to capture a set of images of an object that is illuminated by the generated set of lighting patterns;
   determine pixel-level offset information based on application of an image registration operation on the set of images;
   generate a set of corrected images based on the pixel-level offset information and the set of images; and
   estimate subsurface scattering (SSS) parameters in a form of texture maps corresponding to a 3D mesh of the object,
   wherein the estimation is performed based on a fitting of a scattering model on the set of corrected images.

2. The electronic apparatus according to claim 1, wherein the set of lighting patterns include a set of spherical gradient lighting patterns and a set of area-directional lighting patterns.

3. The electronic apparatus according to claim 1, wherein a plane of polarization associated with a polarizer coupled to each light source of the set of light sources is perpendicular to a plane of polarization associated with a polarizer coupled to each image capture device of the set of image capture devices.

4. The electronic apparatus according to claim 1, wherein
   each image capture device of the set of image capture devices is controlled to capture a subset of images of the set of images,
   the subset of images is associated with a viewpoint of the object; and
   each image of the subset of images is captured based on an illumination of the object with a lighting pattern of the set of lighting patterns.

5. The electronic apparatus according to claim 1, wherein the circuitry is further configured to:
   compute a dense optical flow vector for each image of the set of images,
   wherein the dense optical flow vector is indicative of a relative motion of pixels between a first image of the set of images and a second image of the set of images;
   determine a correction required to be applied on the second image based on the dense optical flow vector, wherein the pixel-level offset information includes the correction; and
   generate a corrected second image based on an application of the correction on the second image,
   wherein the set of corrected images include the corrected second image.

6. The electronic apparatus according to claim 5, wherein the image registration operation includes the computation of the dense optical flow vector, the determination of the correction, and the application of the correction.

7. The electronic apparatus according to claim 1, wherein
   the scattering model is a parameterized model that is parameterized based on one or more properties associated with a surface of the object, and
   the one or more properties include a scattering coefficient, an absorption coefficient, a relative index of refraction, and a phase function.

8. The electronic apparatus according to claim 1, wherein a first texture map of the texture maps is a scattering color map of the object, and a second texture map of the texture maps is a translucency map of the object.

9. A method, comprising:
   in an electronic apparatus:
   controlling a set of light sources to generate a set of lighting patterns;
   controlling a set of image capture devices to capture a set of images of an object that is illuminated by the generated set of lighting patterns;
   determining pixel-level offset information based on application of an image registration operation on the set of images;
   generating a set of corrected images based on the pixel-level offset information and the set of images; and
   estimating subsurface scattering (SSS) parameters in a form of texture maps corresponding to a 3D mesh of the object,
   wherein the estimation is performed based on a fitting of a scattering model on the set of corrected images.

10. The method according to claim 9, wherein the set of lighting patterns include a set of spherical gradient lighting patterns and a set of area-directional lighting patterns.

11. The method according to claim 9, wherein a plane of polarization associated with a polarizer coupled to each light source of the set of light sources is perpendicular to a plane of polarization associated with a polarizer coupled to each image capture device of the set of image capture devices.

12. The method according to claim 9, wherein
   each image capture device of the set of image capture devices is controlled to capture a subset of images of the set of images,
   the subset of images is associated with a viewpoint of the object; and
   each image of the subset of images is captured based on the illumination of the object with a lighting pattern of the set of lighting patterns.

13. The method according to claim 9, further comprising:
   computing a dense optical flow vector for each image of the set of images,
   wherein the dense optical flow vector is indicative of a relative motion of pixels between a first image of the set of images and a second image of the set of images;
   determining a correction required to be applied on the second image based on the dense optical flow vector, wherein the pixel-level offset information includes the correction; and
   generating a corrected second image based on an application of the correction on the second image,
   wherein the set of corrected images include the corrected second image.

14. The method according to claim 13, wherein the image registration operation includes the computation of the dense optical flow vector, the determination of the correction, and the application of the correction.

15. The method according to claim 9, wherein
   the scattering model is a parameterized model that is parameterized based on one or more properties associated with a surface of the object, and
   the one or more properties include a scattering coefficient, an absorption coefficient, a relative index of refraction, and a phase function.

16. The method according to claim 9, wherein a first texture map of the texture maps is a scattering color map of the object, and a second texture map of the texture maps is a translucency map of the object.

17. A non-transitory computer-readable medium having stored thereon, computer-executable instructions which, when executed by an electronic apparatus, cause the electronic apparatus to execute operations, the operations comprising:

controlling a set of light sources to generate a set of lighting patterns;

controlling a set of image capture devices to capture a set of images of an object that is illuminated by the generated set of lighting patterns;

determining pixel-level offset information based on application of an image registration operation on the set of images;

generating a set of corrected images based on the pixel-level offset information and the set of images; and estimating subsurface scattering (SSS) parameters in a form of texture maps corresponding to a 3D mesh of the object, wherein the estimation is performed based on a fitting of a scattering model on the set of corrected images.

18. The non-transitory computer-readable medium according to claim 17, wherein the set of lighting patterns include a set of spherical gradient lighting patterns and a set of area-directional lighting patterns.

19. The non-transitory computer-readable medium according to claim 17, wherein each image capture device of the set of image capture devices is controlled to capture a subset of images of the set of images, the subset of images is associated with a viewpoint of the object; and each image of the subset of images is captured based on the illumination of the object with a lighting pattern of the set of lighting patterns.

20. The non-transitory computer-readable medium according to claim 17, wherein a first texture map of the texture maps is a scattering color map of the object, and a second texture map of the texture maps is a translucency map of the object.

* * * * *